No. 646,912. Patented Apr. 3, 1900.
J. P. LEWIS.
VALVE WHEEL.
(Application filed Aug. 1, 1899.)
(No Model.)

Witnesses:
E. J. Hyde.
C. E. Buckland.

Inventor:
Justus P. Lewis, by
Harry P. Williams,
Atty

UNITED STATES PATENT OFFICE.

JUSTUS P. LEWIS, OF HARTFORD, CONNECTICUT, ASSIGNOR TO THE PRATT & CADY COMPANY, OF SAME PLACE.

VALVE-WHEEL.

SPECIFICATION forming part of Letters Patent No. 646,912, dated April 3, 1900.

Application filed August 1, 1899. Serial No. 725,753. (No model.)

*To all whom it may concern:*

Be it known that I, JUSTUS P. LEWIS, a citizen of the United States, residing at Hartford, in the county of Hartford and State of Connecticut, have invented certain new and useful Improvements in Valve-Wheels, of which the following is a specification.

This invention relates to the wheels which are attached to the spindles and stems or to bushings connected with the spindles and stems of valves and cocks as handles for opening and closing the gates or plugs.

The object of the invention is to so construct and manufacture such wheels that they without any machine operations being performed upon them may be strongly and desirably attached to the spindles or stems or bushings, thereby producing a suitable hand-wheel at a minimum expense.

This invention resides in a hand-wheel having a rim, a perforated hub connected with the rim by arms, and an integral feather projecting from the hub into the perforation, the whole cast integral of the same metal, but the interior wall of the hub and the feather being harder in structure than the outer part of the hub, the arms, and the rim.

Figure 2:
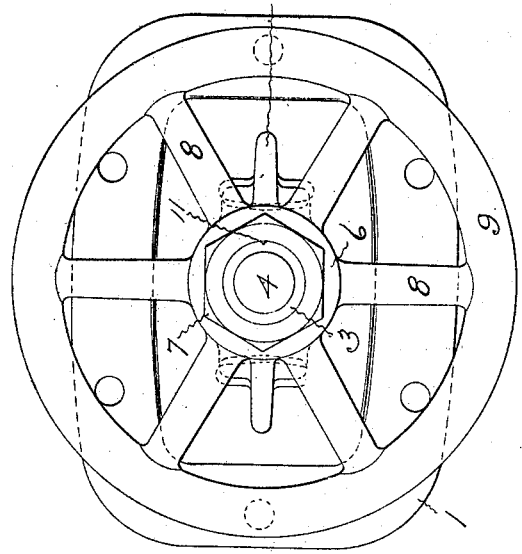
Figure 3:
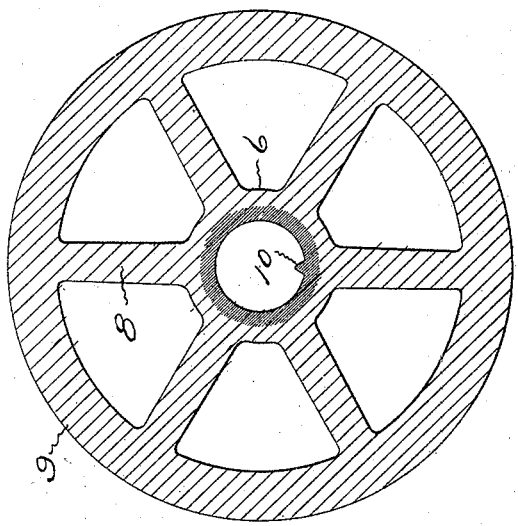
Figure 1:
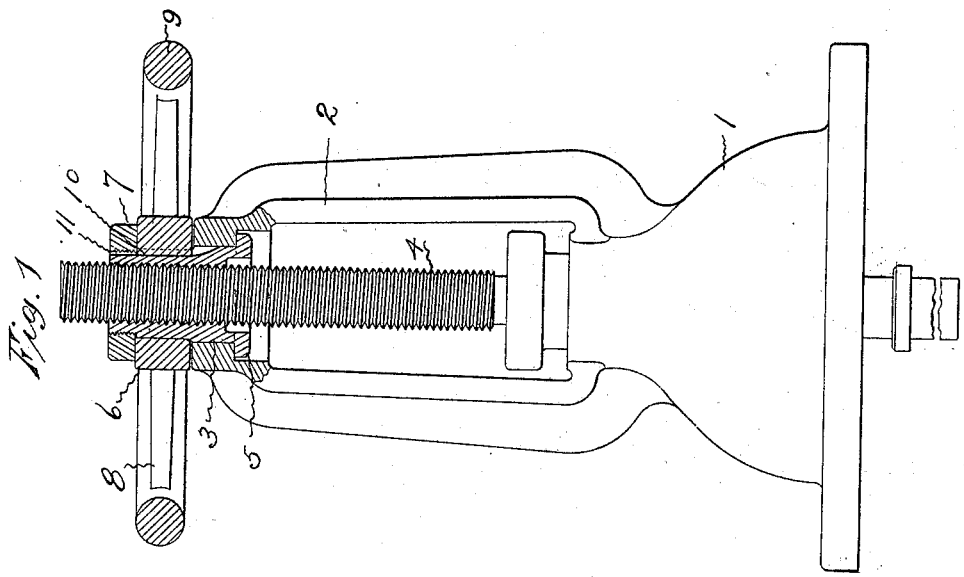

Of the illustrations, Figure 1 is a view of the bonnet of a rising-spindle gate-valve with a portion of the upper end broken away to expose the manner of connecting the hand-wheel, which embodies the invention, with the threaded spindle-bushing. Fig. 2 is a plan of the same, and Fig. 3 is a horizontal section of the hand-wheel.

The bonnet 1, which is shown, is adapted to be attached to the top of the valve-body in the usual manner. The upper end of the yoke 2, which is cast integral with the bonnet, is solid and not divided, as is common. In the perforation through the end of the yoke a threaded bushing 3 is placed, and through this bushing the threaded gate-spindle 4 passes. The lower end of the bushing is provided with a head 5, and the exterior above the head is finished so that it will turn freely in the perforation through the yoke, while above the yoke the bushing is finished to receive the hub 6 of the hand-wheel and the nut 7, that is screwed upon the threaded end of the bushing for holding the hand-wheel from movement outwardly longitudinally of the bushing.

The hand-wheel is cast to shape of metal, preferably iron, with the hub 6, the arms 8, and the rim 9 integral. Projecting into the perforation through the hub is a feather 10. This feather is also cast integral with the hub, the arms, and the rim. When these parts—the rim, the arms, the hub, and the feather—are cast, the metal is poured into a common sand mold, as usual; but the core for the perforation through the hub is formed of material, preferably a hollow piece of metal, which will conduct heat more rapidly than the sand. This core may have a head that will extend along the under face of the hub, so that face, as well as the walls of the perforation and the feather, will be cast smooth and hard. As a result of this the perforation-wall and lower face of the hub and the integral feather are chilled, so as to be very hard, while the outer portions of the hubs and the arms and rim will have a less hard structure. This will cause the perforation to be formed very true and the walls of the lower face of the hub and perforation and the feather to be formed solid, strong, and smooth, so that the interior wall of the perforation and the feather need not be subjected to any machine operation to fit them for receiving the bushing nor the end of the hub to be faced for turning upon the end of the yoke. A groove 11 is milled or broached in the exterior of the bushing for receiving the integral hardened feather. A hand-wheel having the hardened and smooth hub and feather formed in this manner can be quickly placed upon the spindle, stem, or bushing, which it will fit closely, and when held in place by the nut it will fit the end of the yoke desirably. No machine-work is required on the wheel to insure a good fit, and the feather is so strong that it cannot be broken by use. In the form illustrated the head of the bushing bears against the under side of the end of the yoke and resists the strain of closing the gate, and the nut and wheel-hub above the yoke resist the strain of opening the gate. The yoke is cast integral with the bonnet, and the head of the yoke is solid. As this wheel, with the hardened feather, can be cast to finished shape without any machine-work, it is inexpensive to manufacture and has suitable strength and finish for application to valves of various sizes.

I claim as my invention—

1. A cast-metal wheel having a rim and a perforated hub connected with the rim with an integral V-shaped feather projecting from the wall of the hub into the perforation with a bushing fitting the perforation and having a head on one end, a thread on the opposite end, and a V-shaped groove in one side for receiving the V-shaped feather, substantially as specified.

2. A wheel having a rim and a perforated hub with an integral feather projecting from the wall of the hub into the perforation, the whole being cast of the same metal but the interior wall of the hub and the feather being harder in structure than the outer part of the hub and the rim, substantially as specified.

JUSTUS P. LEWIS.

Witnesses:
  H. R. WILLIAMS,
  C. E. BUCKLAND.